US006467747B1

(12) United States Patent
Ellsworth

(10) Patent No.: US 6,467,747 B1
(45) Date of Patent: Oct. 22, 2002

(54) BREAKAWAY SIGNPOST

(75) Inventor: Steven James Ellsworth, Newport Beach, CA (US)

(73) Assignee: Western Highway Products, Inc., Stanton, CA (US)

( * ) Notice: Subject to any disclaimer, the term of this patent is extended or adjusted under 35 U.S.C. 154(b) by 0 days.

(21) Appl. No.: 09/483,578

(22) Filed: Jan. 14, 2000

Related U.S. Application Data

(60) Provisional application No. 60/172,236, filed on Nov. 19, 1999.

(51) Int. Cl.[7] .......................... F16M 13/00; G09F 15/00

(52) U.S. Cl. ......................... 248/548; 248/408; 40/607; 403/6; 403/109.3; 52/98

(58) Field of Search .......................... 40/606, 607, 612; 248/407, 408, 548, 544, 545; 403/6, 109.1, 109.3; 52/98, 153

(56) References Cited

U.S. PATENT DOCUMENTS

| | | | | | |
|---|---|---|---|---|---|
| 2,719,688 | A | * | 10/1955 | Seifert | 403/109.3 X |
| 2,722,970 | A | * | 11/1955 | Stechmann | 248/408 X |
| 3,327,376 | A | * | 6/1967 | Freeman et al. | 248/544 X |
| 3,912,404 | A | | 10/1975 | Katt | |
| 4,553,358 | A | | 11/1985 | Deike | |
| 4,850,565 | A | | 7/1989 | Moreno | |
| 5,082,231 | A | * | 1/1992 | Knowles | 248/545 |
| 5,160,111 | A | | 11/1992 | Hugron | |
| 5,214,886 | A | | 6/1993 | Hugron | |
| 5,387,048 | A | * | 2/1995 | Kuo | 403/109.3 |
| 5,480,121 | A | | 1/1996 | Rice et al. | |
| 5,484,217 | A | | 1/1996 | Carroll et al. | |
| 5,601,299 | A | * | 2/1997 | Yun et al. | 403/6 X |
| 5,782,040 | A | | 7/1998 | McCartan | |
| 5,794,910 | A | | 8/1998 | Granger | |
| 5,860,253 | A | | 1/1999 | Lapointe | |
| 5,887,842 | A | | 3/1999 | Granger | |
| 5,957,425 | A | | 9/1999 | Conway et al. | |
| 6,049,947 | A | * | 4/2000 | Lu | 403/109.3 X |
| 6,079,894 | A | * | 6/2000 | Obitts | 403/109.3 |

* cited by examiner

*Primary Examiner*—Brian K. Green
(74) *Attorney, Agent, or Firm*—Christie, Parker & Hale, LLP

(57) ABSTRACT

A signpost assembly includes a spring-loaded connector designed for connecting a signpost to an anchor member, the signpost being designed to shear off when struck forcefully. The signpost has at least one opening. The connector has a bracket with at least a first support side defining an opening and a second support side, and a base connecting the support sides. The connector also has at least one pin which is spring biased. The pin has an alignment knob at one end. The spring biases the pin between a first compressed position and a second expanded position. The opening in the support side allows the alignment knob to protrude through. The assembled connector is held in place by the spring's tension against the spring side of the stop flanges.

20 Claims, 7 Drawing Sheets

FIG. 3
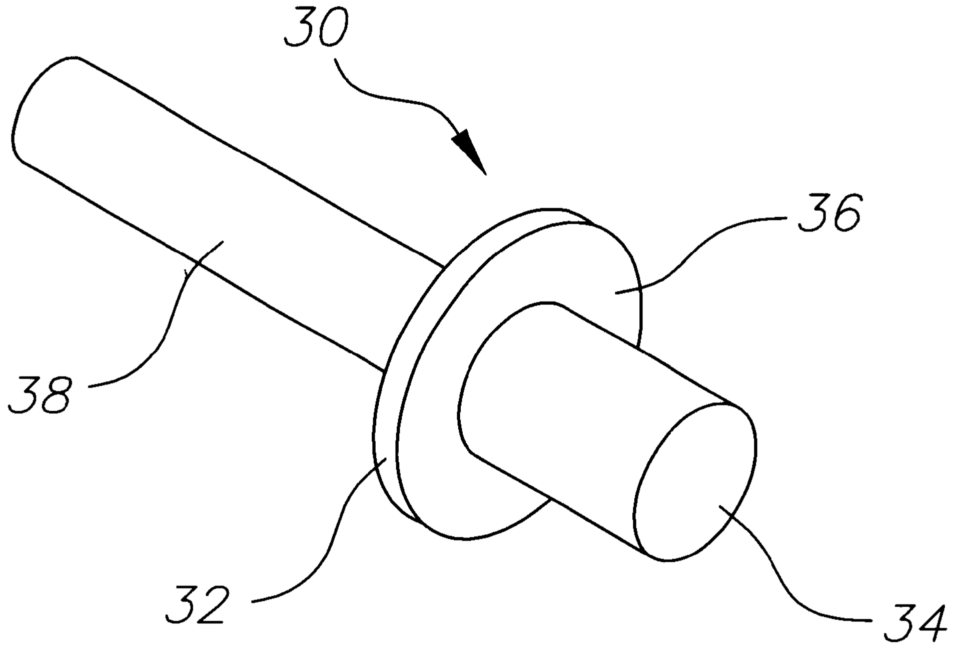
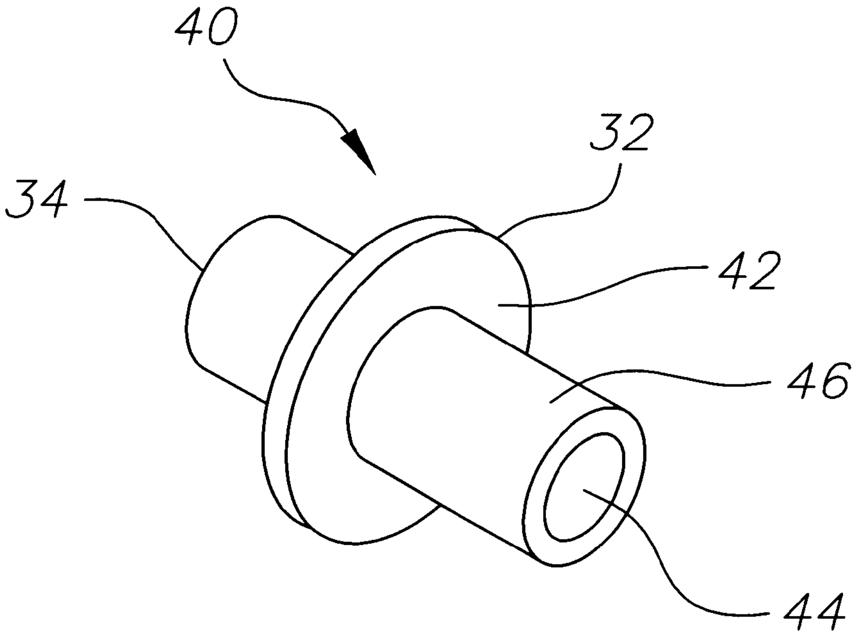
FIG. 4

BREAKAWAY SIGNPOST

CROSS-REFERENCE TO RELATED APPLICATIONS

This application claims priority of U.S. Provisional Application No. 60/172,236, filed on Nov. 19, 1999.

BACKGROUND OF THE INVENTION

This invention relates generally to highway, street, and related signs, particularly those that are designed to break or shear off at a specific location on the signpost when struck by a forceful blow such as by an automobile.

Highway and street signs and their signposts are commonly placed on sidewalks and shoulders of roadways, where they are exposed to a substantial risk of damage from errant automobiles, snowploughs, oversized vehicles, etc. Signposts are generally embedded into dirt or cement to hold them secure from such forces as wind pressure on the face of the sign and human vandals, yet it is often desirable from a safety standpoint to have them break off in a particular location upon a high-force impact such as by an automobile. For example, it is preferable to have the sign shear off and fall away from the direction of impact so that the sign does not fly through the windshield of the car that hit it and thereby injure its occupants, or to have it break off rather than bend and produce a navigational hazard for pedestrians and/or traffic.

Additionally, it is desirable to be able to repair the signpost, rather than to replace it by removing it completely from the dirt, cement, or other substrate in which it is embedded. It may be less expensive and easier to effect a repair if the signpost has been broken in a predetermined area rather than bent by the force of the impact. Toward this end, several means exist to fasten signposts to anchoring devices embedded into the substrate which will break away upon impact and have some means of replacing broken or bent signposts.

One type of breakaway signpost, set forth in U.S. Pat. Nos. 5,957,425, 5,887,842, and 5,794,910, for example, employs an anchor embedded in a substrate and a signpost attached to the anchor and extending above the ground. The anchor is generally a length of metal (tube or formed strip) of the same type and configuration as the signpost. A stress transfer strip or block of metal is inserted between overlapping segments of the anchoring piece and the signpost. The three pieces—the anchor, the stress transfer strip, and the signpost—are generally bolted together in two or more places through aligned holes in the pieces and held securely by tightening the bolts. This splice arrangement is designed as a stress transfer mechanism, whereby the bar stiffens the signpost against the wind and serves to reduce momentary (e.g., wind-derived) stresses on the individual bolts of the assembly, but at the same time provides a predictable breakaway joint upon impact.

A disadvantage of this type of breakaway signpost is that the mechanisms may work better when the sign is struck from a frontal direction compared to other directions, because the bolts are designed to shear upon impact, and a frontal blow will put stress on the top bolt first and then the second, allowing them to break sequentially. A side blow may distribute the stress on the bolts more evenly, allowing them to hold and the signpost to bend rather than break away. Another disadvantage is that once the signpost has broken off, the anchor post is left sticking up above the substrate. This latter disadvantage may pose a risk of damaging the undercarriage of the vehicle which struck the sign.

Even a small length of anchor post above the substrate is problematic when the sign is located on a sidewalk or heavily traveled pedestrian route, since the anchor post may not be seen by a pedestrian, who could suffer an injury because of it.

Other breakaway signpost designs have addressed one or both of these problems to at least some extent. One design uses a connector which attaches to each end of a sign post and a ground anchor post, and separates the ends by a weakened region designed to shear off upon impact. Examples of such connectors can be seen in U.S. Pat. Nos. 5,480,121 and 5,782,040. These designs will shear equally well in response to an impact from any direction, but can still leave a portion of the post sticking up above the ground.

U.S. Pat. No. 4,553,358 discloses a specially shaped angle iron anchor socket, designed to accommodate a conventional hat section channel signpost, which is driven into the ground. When the signpost is put into this socket and a compression leg is installed to force the post against the angle iron of the socket, the tension on the signpost below the ground creates a zone which is designed to shear when the signpost is struck by a vehicle.

While the device disclosed in this patent addresses the problem of ground-level shearing, it can only be used with a single type of signpost, the hat section channel signpost, and is not adaptable to a tubular signpost, for example.

All of the above designs, while addressing various problems, still do not solve certain problems. Most of the designs have the problem that they are cumbersome and time-consuming to install, move, and repair, particularly by one person, because they require welding of the component parts, or screwing and unscrewing of nuts and bolts.

It should be appreciated, therefore, that there is still a need for a signpost assembly mechanism that is quick and easy to install, remove, and replace if damaged, and which further is able to provide reliable ground-level shearing upon impact from any direction.

SUMMARY OF THE INVENTION

The present invention is embodied in a signpost assembly having a spring-loaded connector which is fast and easy to install, to remove while the signpost is intact, and to replace when the signpost is damaged. Upon a forceful impact from any direction, a signpost and anchor secured by the spring-loaded connector of the invention will shear at any pre-set level including at ground level as is generally preferable.

The signpost assembly of the present invention is designed for connecting a signpost to an anchor member. It includes a signpost having a pair of openings, a connector having a bracket with at least a first support side and a second support side, and a base connecting the support sides. Each support side has an opening. The assembly also has a first pin and a second pin, each having an alignment knob, and a spring biasing the first pin and the second pin from a first position where the alignment knobs are close together to a second position where the alignment knobs are spaced further apart than in the first position. The openings of the first and second support sides are adapted to receive a respective alignment knob, so that when the pins are placed between the first and second support sides, the alignment knobs protrude through the openings in the support sides of the bracket. The bracket is adapted to fit between the pair of openings of the signpost such that the openings of the first and second support sides are aligned with the pair of openings, and the alignment knobs protrude through the aligned openings to secure the bracket to the signpost.

A feature of the invention is the spring biased pin/connector assembly. The advantage of this assembly is that no bolts are required to secure the signpost to an anchor member in the ground. This makes installation of the sign fast and easy.

Another feature of the invention is a hinge associated with the support sides of the bracket. This feature facilitates easy removal of the signpost from the anchor member or the connector from the signpost by allowing the support sides to be squeezed together around the hinge from an expanded position to a position where the spring is compressed and the alignment knobs are pulled from the openings in which they rest. As with the installation, no screwing or unscrewing of bolts is needed and the procedure is quick and easy.

The invention also features an anchor member which has at least one pair of openings opposite each other and whose cross sectional area is sufficiently large to fit the cross sectional area of the signpost within it. The anchor openings are large enough for the alignment knobs to fit within them. When the signpost is slid into the anchor member, each opening of the signpost is aligned with the openings of the anchor member, and the alignment knobs of the spring-loaded connector can pop into the openings of the signpost and the anchor. An advantage of this feature is that the signpost can easily be inserted into a pre-installed anchor member.

Another feature of the invention is installation of the anchor member into the ground or a substrate so that no portion of it is above the substrate level. Optionally, the anchor member is reinforced by a strengthening sleeve which has at least one pair of openings opposite each other and whose cross sectional area is sufficient to fit the cross sectional area of the anchor within it. The strengthening sleeve openings are large enough so that the alignment knobs fit within them, and the openings are aligned with the anchor openings. An advantage of these features is that ifthe post is struck forcefully, for example by a vehicle, it will shear off at ground level rather than bend or break at a higher level where it could pose a danger to vehicles or pedestrians.

Another feature of the invention is that the signpost assembly is easily disassembled because the support sides can be moved between a first expanded position and a second compressed position. This movement can be achieved by rotation around a hinge in the base or by bending flexible support sides. An advantage of this is that the sign can be moved if desired, and easily repaired if broken.

Another feature of the invention is a compression flange adjacent to each support side, each compression flange having a wing portion which is parallel to but inset from the support sides, and which can further comprise a hole through which a spring release tool can be threaded and two indentations on the edge of the upper end adapted for grasping by the digits of a hand. The advantage of this feature is that the spring-loaded connector can be easily removed by hand from a broken signpost in the field.

Also provided in the invention is an insert and removal tool having a handle into which is fixed a long blade and a short blade which are formed in a "V" shape where they connect to the handle. The blades are parallel to each other at their ends distal to the handle, and are adapted to receive the bracket, spring and first and second pins so that the spring is compressed when the bracket is seated in the insert and removal tool. The advantage of this feature is that the spring35 loaded connector can be easily installed or removed from an intact sign.

The invention also includes a method for installing a signpost into a substrate, the method comprising providing a signpost and an anchor member each having at least one pair of openings opposite each other, the anchor member's cross sectional area being sufficient to fit the cross sectional area of the signpost within it, a bracket having at least a first support side and a second support side and a base connecting the support sides, each support side having an opening, and a spring biasing apart a first pin and a second pin, each pin having an alignment knob at one end and a stop flange adjacent to the alignment knob. The stop flange has a spring side and a bracket side. The method involves inserting the anchor member into the substrate, placing the spring biased pins inside the bracket, placing the bracket inside the signpost, aligning the openings in the first and second support sides with the openings in the signpost and the openings in the anchor member. The openings in the first and second support sides are adapted to receive a respective alignment knob and are smaller in diameter than the stop flange, and the openings in the signpost and anchor are sized to receive the alignment knob. The pins are positioned so that the alignment knobs protrude through the openings in the signpost and into the openings in the anchor. The bracket side of the stop flange stops the outward travel of the pins, and the pins are held in place by the spring's tension against the spring side of the stop flanges.

A feature of the invention is that the signpost can be removed from the anchor. The method for removing the signpost involves compressing the spring so that the alignment knobs are drawn within the signpost, and the signpost is withdrawn from the anchor.

Other features and advantages of the present invention will become apparent from the following description of the preferred embodiments, taken in conjunction with the accompanying drawings, which illustrate, by way of example, the principles of the invention.

DESCRIPTION OF THE DRAWINGS

FIG. 3 is a perspective view of a first pin of the spring loaded connector of the present invention.

FIG. 4 is a perspective view of a second pin of the spring loaded connector of the present invention having an opening adapted to slidably receive the first pin.

DETAILED DESCRIPTION OF THE INVENTION

Figure 1:
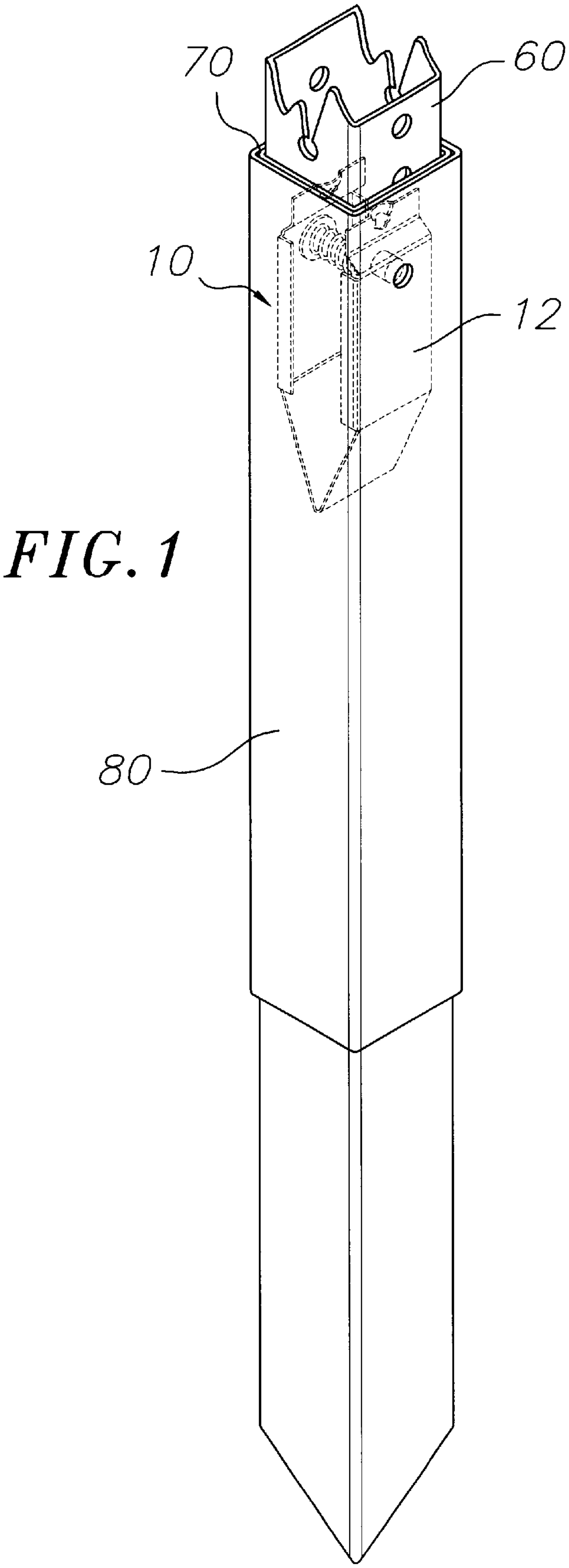
FIG. 1 is a perspective view of the spring-loaded connector of the present invention with strengthening sleeve, anchor, and signpost shown.

FIG. 1 shows the signpost assembly of the present invention. A spring-loaded connector is engaged inside of a signpost 60, which rests in an anchor member 70. Also shown is a strengthening sleeve 80 in which the anchor member 70 rests.

Figure 2:
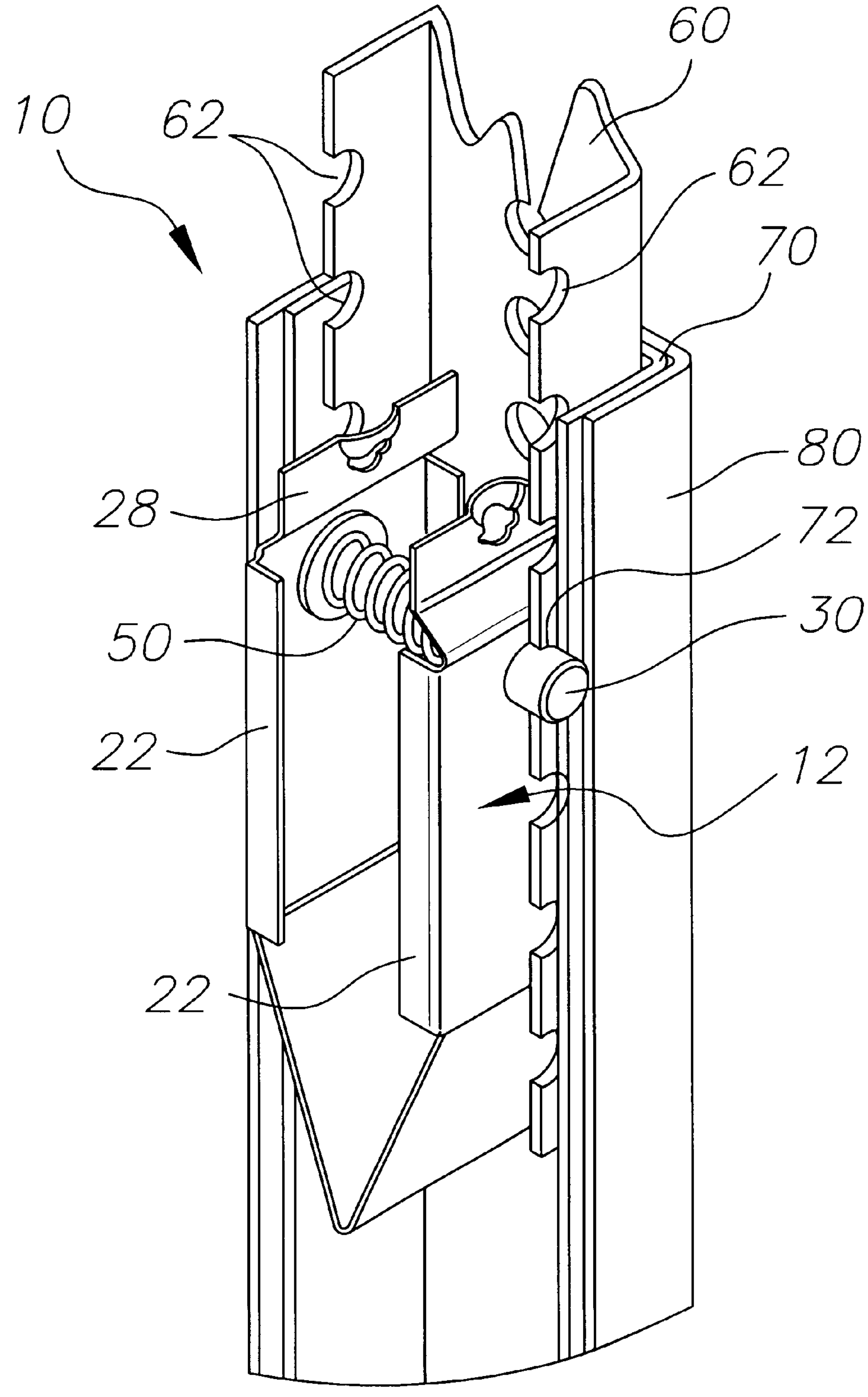
FIG. 2 is a perspective view of the spring-loaded connector of the present invention with strengthening sleeve, anchor, and signpost layers removed for better visualization.

As detailed in FIG. 2, the present invention is embodied in a spring-loaded connector, indicated generally by the reference numeral 10, for connecting a signpost 60 to an anchor member 70, and, optionally, a strengthening sleeve 80. The connector is comprised of abracket 12 and two pins 30 and 40 biased outward by a spring 50. Turning to FIGS. 3 and 4, the pins of the invention have a stop flange 32 and an alignment knob 34. The alignment knob 34 is on one end of the pin, and the stop flange 32 is adjacent to the alignment knob 34. The stop flange has a bracket side 36 and a spring side 42. In the embodiment shown in FIGS. 3 and 4, the pins 30 and 40 are designed to slidably connect with each other, with the diameter of male fitting 38 being sized to fit within the opening 44 of female fitting 46. It will be appreciated that the two pins need not connect, and many other pin embodiments are functional in the spring-loaded connector. The alignment knobs of the pins are of a suitable material, size and shear strength to be able to support the weight of the signpost, including wind-induced apparent weight. The weight to be supported with generally be over about 10 pounds, preferably over about 20 pounds, including wind-induced weight. In a preferred embodiment, the alignment knobs are of stainless steel and are at least 0.25" in diameter, more preferably at least 0.4" in diameter. The alignment knobs can be hollow or solid, preferably solid. It will also be appreciated that any type of spring (e.g., coil, leaf, or torsional) may be used in the invention to bias the pins away from each other.

Figure 5:
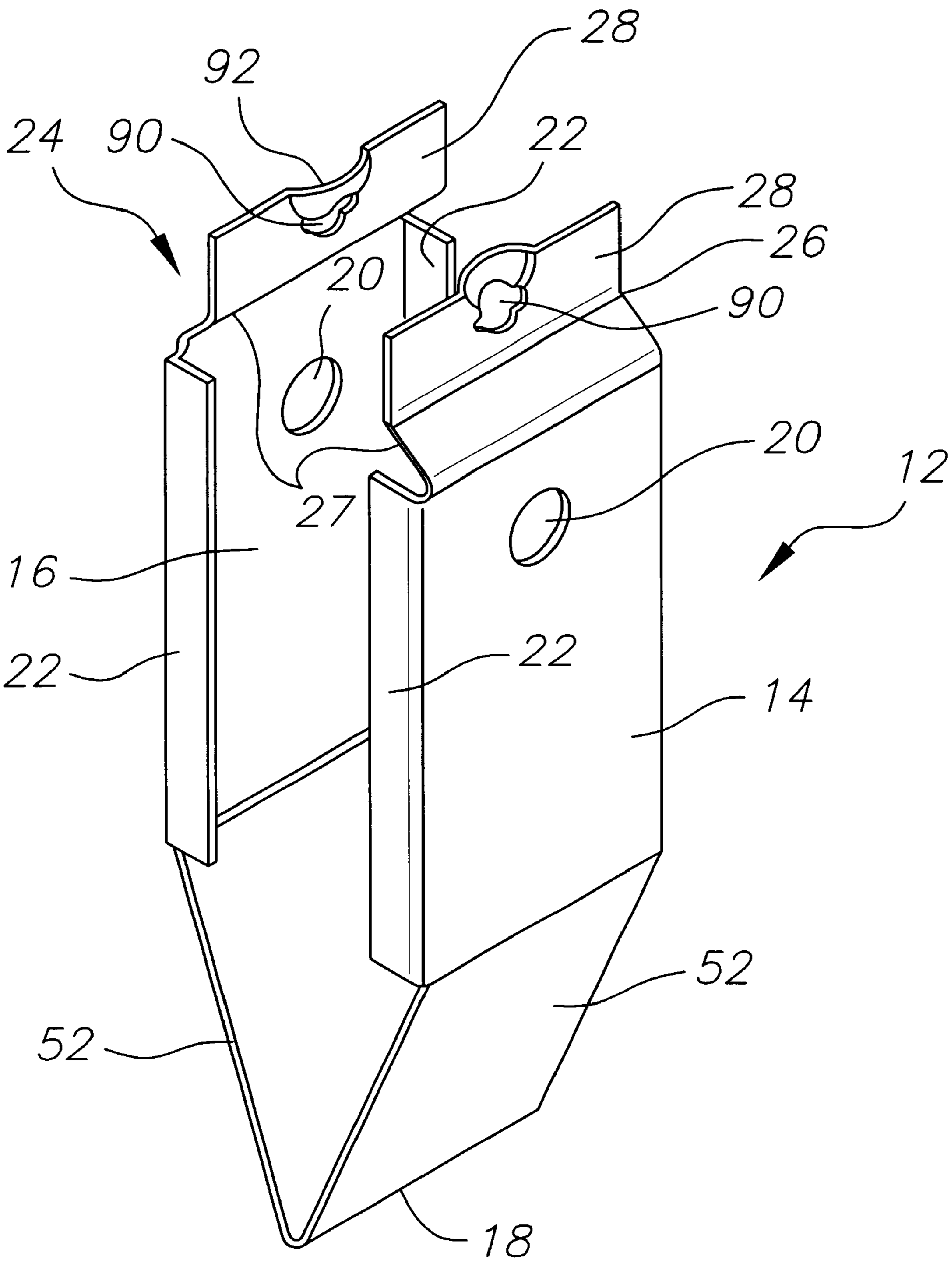
FIG. 5 is a perspective view of a bracket for the spring-loaded connector of the present invention.

FIG. 5 shows the bracket 12 of the invention, having two support sides 14 and 16 which are connected by a hinge 18. The hinge 18 is formed by angled walls 52 which converge inwardly and collectively (hinge 18 and walls 52) form a base of the bracket 12. The hinge 18 more easily permits the support sides 14 and 16 to more easily move between a first expanded position and a second compressed position.

The support sides each contain an opening 20 adapted to receive a respective alignment knob 34. In the embodiment shown, the support sides 14 and 16 have support flanges 22 which are folded in from or attached to the lateral edges of the support sides 14 and 16. Additionally, the support sides 14 and 16 each have a compression flange 24 and 26 extending longitudinally from the top of its respective support side. The compression flanges 24 and 26 are each folded or formed so as to have an inwardly angled wall 27 and a wing portion 28. The wing portion 28 is adjacent to the inwardly angled wall 27, and is inset from but parallel to the support sides 14 and 16. The wing portion 28 contains a hole 90, and a depression 92 at the top of the wing 28 adapted to be grasped by the digits of a hand.

Figure 8:
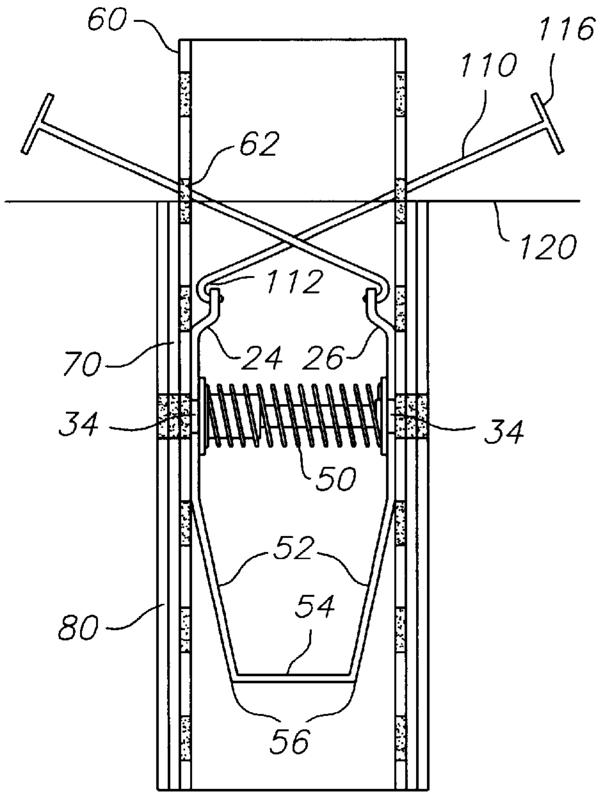
FIG. 8 is a cross sectional view of the spring-loaded connector of the present invention in an assembled signpost, and demonstrates a technique for removing the signpost from the anchor.

An alternative embodiment of the bracket 12 is shown in FIG. 8. In this embodiment, the base has angled walls 52 which each meet a flat side 54, forming hinges 56. Hinges 56 each allow their respective support side 14 or 16 to pivot between an expanded state and a compressed state. Alternatively, flat side 54 can be merely a support platform, and the support sides can be flexible. In this situation, the flat side 56 holds the base steady while flexible support sides 14 and 16 move between the expanded and compressed position. It will be appreciated that the configuration of the base may be any which permits movement of the support sides, whether by one or more hinges in the base, or by serving as a rigid support allowing more flexible support sides 14 and 16 to bend between a first expanded position and a second compressed position.

FIG. 2 shows the spring-loaded connector 10 of the invention assembled and inserted in a signpost 60, which is inserted in an anchor member 70 seated in a strengthening sleeve 80 (cut away). The signpost 60 generally has a plurality of opposite pairs of holes 62 (shown cut away) uniformly spaced along its length. Preferably, one pair of holes 62 is used for attachment using the connector 10 of the invention. These holes 62 are sized so that the alignment knobs 34 can fit into them.

The signpost may be of any cross-sectional shape, including a square as shown, a circle, or a hat shaped iron leg. Its length is variable but it will generally be long enough to include a length of from about two inches to several feet to be inserted into the anchor and ground, and enough additional length to support a sign at a desired height above the level of the ground into which the signpost is inserted. The signpost can be made of any suitable material which is sufficiently rigid and sturdy to support the forces upon the signpost, but is preferably constructed of metal, more preferably galvanized carbon steel.

The signpost is adapted to receive a sign which is generally of the nature to route traffic of any kind (e.g., along a byway for vehicles, pedestrians, bicycles, or horses), or provide directional, cautionary, or descriptive information (for example, population ofa city, miles distant to a city, etc.). The sign may be of any desired size, and may be secured by more than one signpost.

The anchor member 70 is a hollow length of material having at least one pair of holes 72 opposite each other, which are sized so that the alignment knobs 34 can fit into them. The cross-sectional shape of the anchor member 70 can be any shape and size which will accommodate the signpost 60 within it, but is preferably of the same shape as the signpost and sized to closely fit the signpost within it. The length of the anchor member 70 is variable but is preferably at least a few inches in length, and is more preferably 6"–54" in length. Suitable anchor member designs are described in U.S. Pat. 5,732,516, hereby incorporated by reference.

A strengthening sleeve 80 is optional, and is a hollow length of material having at least one pair of holes 82 opposite each other which are sized so that the alignment knobs 34 can fit into them. The cross-sectional shape of the strengthening sleeve 80 can be any shape and size which will accommodate the anchor member 70 within it, but is preferably of the same shape as the anchor member and sized to closely fit the anchor member within it. The length of the strengthening sleeve 80 is variable but it is preferably at least a few inches in length, and is more preferably 6"–36" in length.

Figure 6A:
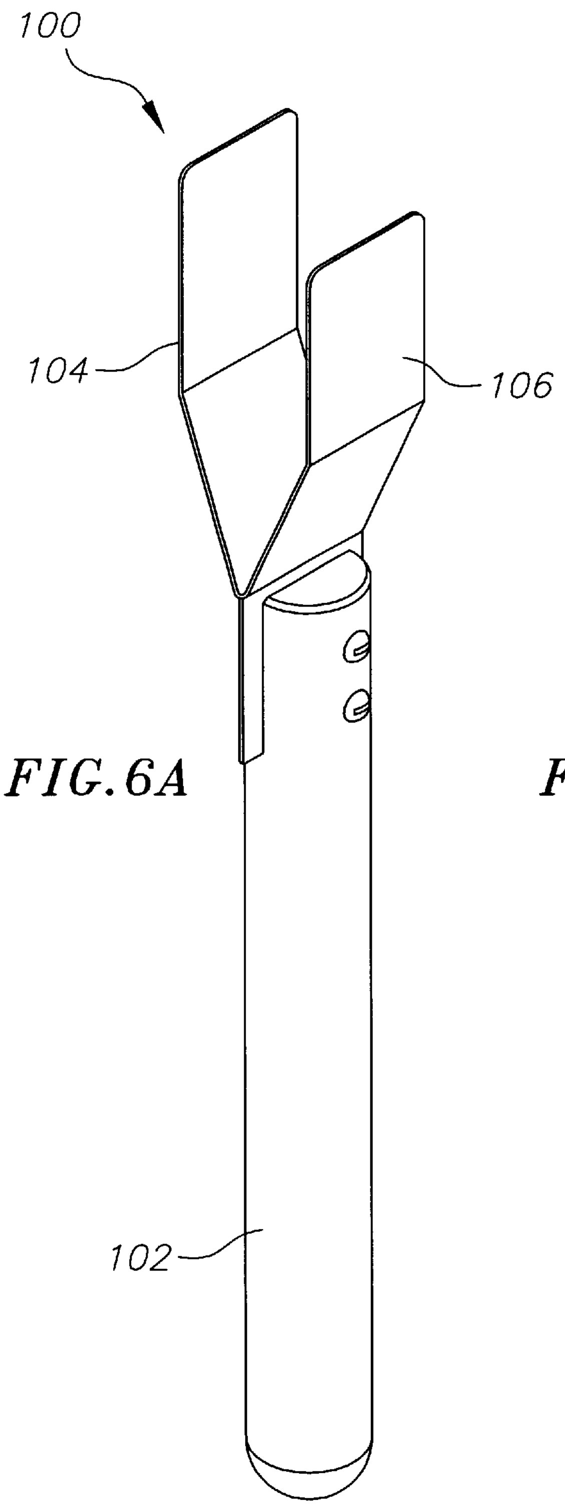
FIG. 6A is a perspective view of an insert and removal tool for insertion and removal of the spring-loaded connector into or out of a signpost.
Figure 6B:
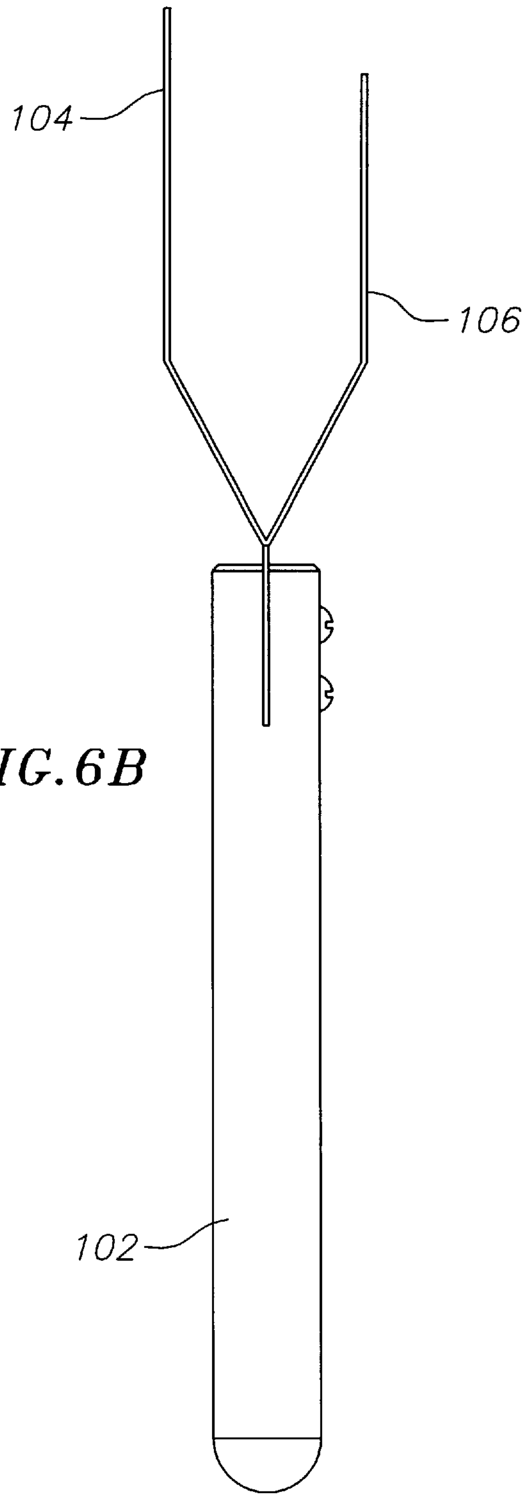
FIG. 6B is a cross-sectional view of the insert and removal tool of FIG. 6A.

To facilitate insertion and removal of the spring-loaded connector 10 into or out of a signpost 60, an insert and removal tool 100 and spring release tool 110 can be used. The insert and removal tool 100 is shown in FIGS. 6A and 6B and has a handle 102 into which is fixed a long blade 104 and a short blade 106 which are formed into a receptacle to receive the spring-loaded connector bracket 12. The bracket 12 seen in FIG. 5 would fit between the blades 104 and 106 with the hinge 18 abutting the base of the blades where they connect to handle 102 in a "V" shape, and the support sides 14 and 16 would fit between the blades 104 and 106 at their distal ends where they are parallel to each other. Preferably, the blades are both long enough to cover the openings 20 in the support sides when the bracket 12 is seated in the tool 100. The long blade 104 is longer than the short blade 106 by at least about the diameter of the opening 20 in the support sides 14 and 16, preferably about ¼". The blades are not so long, however, that they reach the level of the openings 90 in the wing portions 28 of the compression flanges 24 and 26. The handle 102 is long enough to fit into the signpost 60 as far as necessary to place the spring-loaded connector 10 in the desired location and still have enough protruding from the signpost to be easily grasped. Preferably, this length will be about 1–2 feet. The cross-sectional dimension of the handle 102 and the blades 104 and 106 must also be suitably sized to fit within the signpost interior. As will be apparent, the means of fixing the blades to the handle may be any which are reasonably stable, such as screws, rivets, glue, or dowels, or the handle and blades may be formed from a single piece of suitable material, such as stainless steel, wood, or a rigid polymer material.

Figure 7:
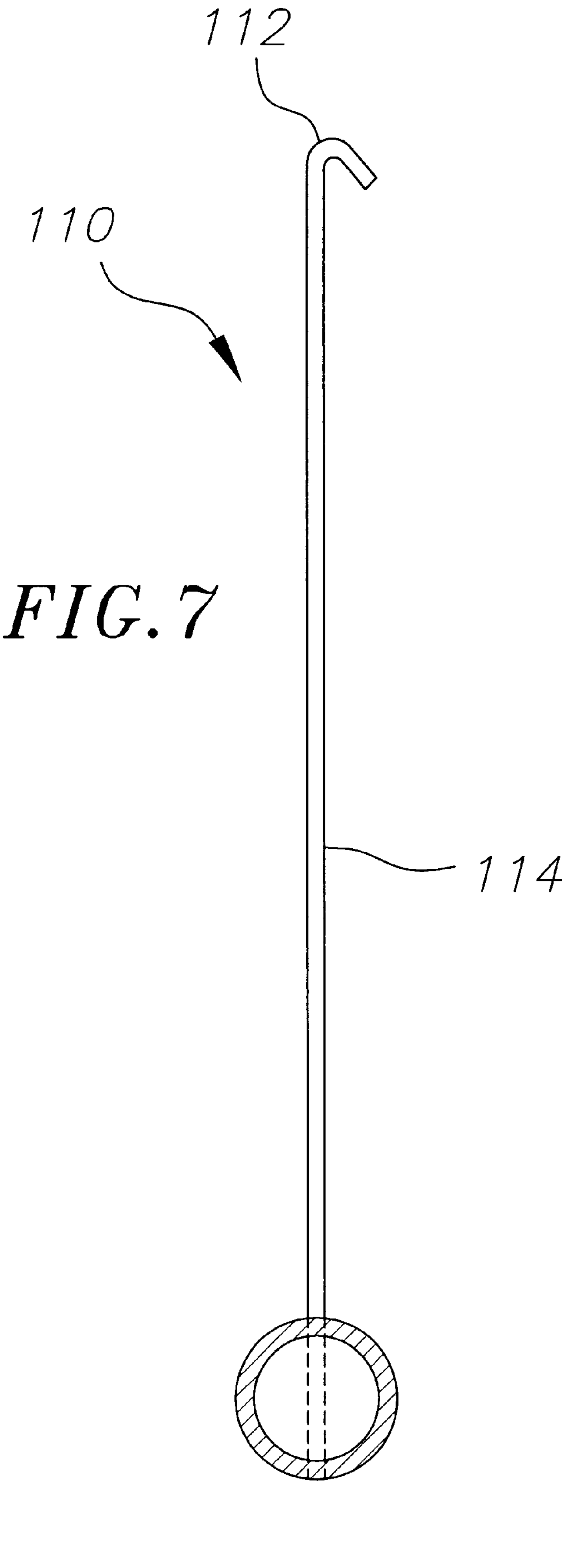
FIG. 7 is a cross sectional view of a spring release tool for use during insertion or removal of the spring-loaded connecter into or out of a signpost.

FIG. 7 illustrates a preferred embodiment of a spring release tool 110 of the invention. The spring release tool 110 includes a body portion 114, essentially a length of stiff, thin material such as 14 gauge steel wire, and has a hook 112 at one end. The spring release tool 100 optionally includes ahandle 116 (shown in FIG. 8). The body portion 114 and the hook 112 of tool 110 are sized to fit through the hole 90 in the wing portion 28 of the bracket 12, and also through the openings 62 of the signpost.

Installation of a Signpost

The spring-loaded connecter 10 is assembled by compressing the spring 50 and pins 30 and 40 between the support sides 14 and 16 of the bracket 12 and releasing the tension so that the alignment knobs 34 of the pins slip into the openings 20. The openings 20 are sized so that the stop flanges 32 will not pass through and the bracket side of the stop flanges 36 will abut the support sides 14 and 16 and stop the outward travel of the pins. The alignernt knobs 34 protrude through the openings.

The assembled spring-loaded connector 10 is inserted into a signpost 60 by applying inward pressure on the alignment knobs 34 greater than the spring tension, so that the knobs 34 are pushed toward each other until their protrusion is reduced enough for the assembled connector to slide within the signpost 60. The compressed connector is then slid into the desired location in the signpost near a pair of holes 62 and is maneuvered until the alignment knobs 34 pop through the holes 62, seating the connector 10 in the signpost 60. Preferably, the support sides 14 and 16 rest against the sides of the signpost 60 and provide torsional strength and longitudinal support (to limit flex over the length of the support sides) to the signpost assembly. In a more preferred embodiment, the support flanges 22 provide additional support and stabilize the connector.

The insert and removal tool 100 and spring release tool 110 can be used for insertion of the spring-loaded connector 10 into the signpost 60 as follows. The alignment knobs 34 of the connector 10 are compressed as described above and the connector 10 is seated in the insert and removal tool 100 in its compressed state, with the blades holding the alignment knobs 34 in the compressed position. The insert and removal tool 100 with the compressed connector 10 are inserted to the desired location into the signpost 60 from the end that will be anchored into the substrate, wing portion 28 end first. The spring release tool 110 is threaded into a hole 62 of the signpost and through a hole 90 of the compression flange 24 or 26. With the spring release tool 110 holding the spring-loaded connector 10 securelyby ahole 90, the insert and removal tool 100 is withdrawn from the signpost 60, leaving the connector 10 behind. The connector 10 is manipulated with one or more spring release tools 110 until the alignment knobs 34 pop through the holes 62. In a preferred embodiment, the holes 90 in compression flanges 24 and 26 are spaced apart from the openings 20 in support sides 14 and 16 by exactly the distance that pairs of holes 62 in signpost 60 are spaced, so that spring release tool 110 can be slid straight through holes 62 and holes 90, and alignment knobs 34 will be placed for proper decompression through axially adjacent holes 62 in the signpost 60 upon withdrawal of insert and release tool 100.

Once the spring-loaded connector 10 is inserted into and seated in the signpost 60, the signpost can be installed easily in the anchor member 70. The anchor member 70 is first installed into the ground or preferred substrate (e.g., cement), along with a strengthening sleeve 80 if desired. Preferably, the anchor member and strengthening sleeve are welded together before driving them into the ground. The holes 72 of the anchor member and the holes 82 of the strengthening sleeve are preferably in alignment after installation into the substrate. Once the anchor member 70 is installed into the ground, the lower end of signpost 60 is inserted into the anchor member 70. Inward pressure is applied to the alignment knobs 34 protruding through the holes 62 of the signpost until the knobs 34 are pushed toward each and their protrusion is reduced enough for the signpost 60 to slide within the anchor 70. The signpost 60 is then slid into the anchor 70 to the area of the holes 72 and maneuvered until the alignment knobs 34 pop through the holes 72, seating and securing the signpost 60 in the anchor 70. If a strengthening sleeve 80 is included, its holes 82 are aligned with the anchor holes 72, and the alignment knobs 34 will pop through both sets of holes 72 and 82 when the signpost 60 seats in the anchor 70.

Figure 9:
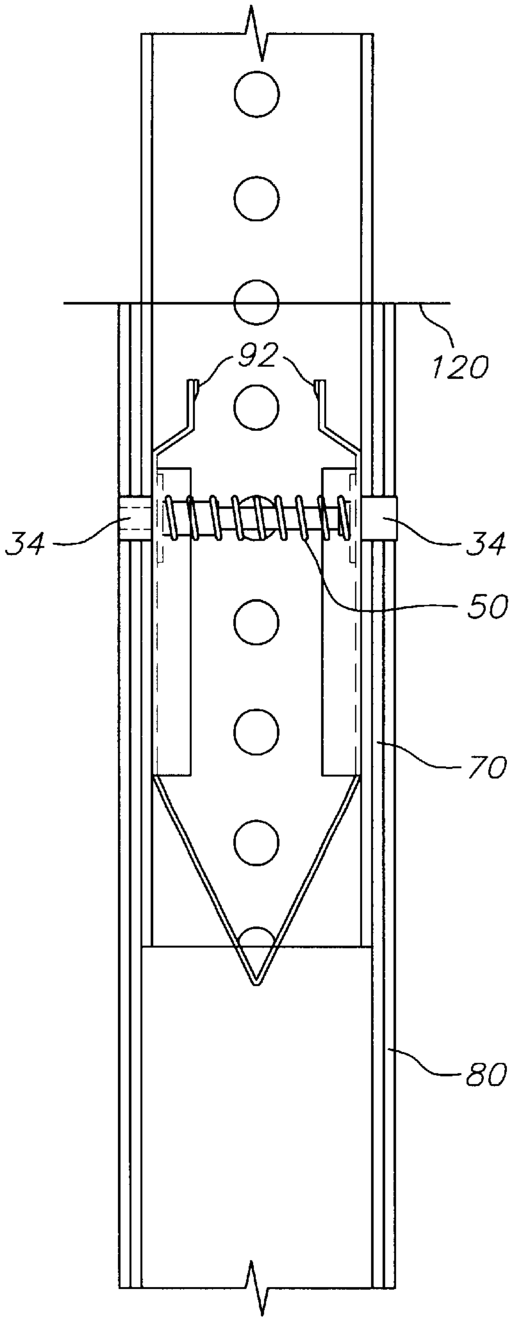
FIG. 9 is a cross sectional view of an assembled and installed signpost of the present invention showing the relative positions of the components as compared to ground level.

In apreferred embodiment, the anchor member 70 (and strengthening sleeve 80, if used) are installed in the substrate so that their upper edges are flush with the level of the substrate. In this configuration, the assembled signpost will shear off at ground level upon a forceful impact because the rigidity conferred by the anchor 70 (and strengthening sleeve 80) on the signpost creates a natural shearing point due to stress transfer in the impact. This ground-level shearing effect is enhanced by configuring the signpost and anchor assembly so that when installed, the signpost 60 rests in the anchor 70 at a depth wherein a pair of holes 62 (not contacting the springloaded connector 10) is halfway above ground level and halfway below ground level (see FIG. 9). This configuration creates a weak point in the signpost right at ground level where the shearing force will be greatest upon impact.

Removal of an Intact Signpost from the Ground

Sometimes it is necessary to remove a sign from a location, for example to conduct road maintenance or for seasonal directional needs, or if the sign has been damaged and bent but not broken off at ground level. Removal of such a signpost installed with the spring-loaded connector of the invention is quickly and easily performed as a result of the hinged bracket 12. Referring to FIG. 8, a first spring release tool 110 is inserted into a first hole 62 of the signpost above ground level and the hook 112 is threaded through an opening 90 in a compression flange 24 on the side of the signpost opposite the site of entry 62 with the tool 110. A second spring release tool 110 is inserted through the second (and opposite) hole 62 and its hook 112 is threaded through the opening 90 on the compression flange 26 on the side of the signpost opposite the site of entry, resulting in crossed spring release tools 110 as seen in FIG. 8. The ends of the tools 110 outside of the signpost are pulled outward, applying inward pressure on compression flanges 24 and 26. This pressure results in support sides 14 and 16 pivoting from a first position adjacent to the walls of signpost 60 around one or both of hinges 56 to a second position away from the walls of signpost 60. The movement around the hinge 18 causes a compression of spring 50 and a movement of pins 30 and 40 toward each other. This compression is continued until alignment knobs 34 are pulled within the signpost. At this point, the inherent upward pull of spring release tools 110 relocates the spring-loaded connector 10 within the signpost 60 to a position where the alignment knobs 34 are not aligned with any holes 62 in the signpost and are thus held in a compressed position. The signpost can then be withdrawn from the anchor 70.

Removal of the Spring-Loaded Connector from a Signpost

The spring-loaded connector 10 can be removed from an uninstalled signpost 60 left in the conditionjust described, with the alignment knobs compressed in the interior of the signpost, by holding the connector 10 steady with one or both of the spring release tools 110 and sliding the insert and removal tool 100 over the connector 10 from the bottom of the signpost until it seats in the "V" at the bottom of the tool 100. At this point, the alignment knobs 34 are held compressed by the blades 104 and 106 of the insert and removal tool 100, and the connector 10 can be withdrawn from the signpost by pulling on the handle 102 of tool 100. Alternatively, if the spring-loaded connector 10 is seated in the signpost 60 with alignment knobs 34 fully protruding, then the connector 10 is removed as follows. A spring release tool 110 is inserted into a hole 62, preferably a hole aligned with the holes 90 of the compression flanges 24 and 26, and one or both of the holes 90 are threaded by the spring release tool 110. If the holes 90 are aligned with a pair of holes 62 in the signpost, the spring release tool 110 is threaded through all holes so that it sticks out on both sides of the signpost 60.

The spring release tool 110 is used to hold the connector 10 steady while the insert and release tool 100 is inserted from the bottom of the signpost up to the connector. First, the long blade 104 will hit an extended alignment knob 34, which is then manually pressed in until it clears its respective hole 62 in the signpost and the long blade 104 can be slid past it, holding it compressed. The insert and removal tool 100 is advanced fuirther until the short blade 106 hits the other alignment knob 34 which is protruding out of another hole 62 in the signpost. The second alignment knob 34 is then manually pressed in until it clears the interior of the signpost and the short blade 106 can be slid past and the entire bracket is seated in the insert and removal tool 100. At this point, the alignment knobs 34 are held compressed by the insert and removal tool 100 and the connector 10 can be withdrawn from the signpost by pulling on the handle 102 of tool 100.

Removal of a Sheared Off Signpost

In the event that the installed signpost assembly is struck by a vehicle or otherwise sheared off at or close to ground level, removal of the broken signpost portion left in the anchor 70 is easily accomplished without need for tools. As can be seen from FIG. 9, the wing portion 28 of compression flanges 24 and 26 is just below ground level (or substrate level) 120, preferably no more than about 2". The spring-loaded connector 10 is accessible from the open sheared section of the signpost 60 by reaching into the signpost opening and grasping the wing portions 28 at depression points 92, manually squeezing them inwardly until the support sides 14 and 16 compress spring 50 and alignment knobs 34 until they can be withdrawn from the holes 82 and 72 in the strengthening sleeve 80 and anchor member 70 in which they rest. Once the alignment knobs 34 are removed from holes 82 and 72, the entire signpost portion and spring-loaded connector can be withdrawn from the ground. Alternatively, the spring-loaded connector 10 can be withdrawn first by squeezing the wing portions 28 until the alignment knobs 34 clear holes 82, 72, and 62 in the signpost. The signpost segment can then be removed, as nothing is holding it secure in the anchor 70.

It will be apparent that among the many advantages of the present spring-loaded signpost connector design, ease of use is of considerable importance. There is no need to screw or bolt any portion of the device during installation or removal, and assembly and disassembly requires only movement of mechanical parts by hand or using simple tools. The signpost is easily repaired whether the sign is merely bent, broken off at a high level, or sheared off flush with the ground. An additional advantage of the ground level shearing feature is that more useable signpost is left intact in the upper portion than with higher level shearing, so the signpost may not need to be replaced until it has been sheared offmore than once. A signpost assembled using the spring-loaded connector is also quite tamper resistant.

Although the invention has been described in detail with reference only to the preferred embodiments, those having ordinary skill in the art will appreciate that various modifications can be made without departing from the invention. Accordingly, the invention is defined with reference to the following claims.

What is claimed is:

1. A signpost assembly comprising:

a signpost having at least one opening;

a bracket having a first support side and a second support side and a base connecting the support sides, at least one of the first and second support sides defining an opening;

a pin located between the support sides and having an alignment knob that is located in the opening of the bracket when the bracket and the pin are assembled, the alignment knob being movable between a retracted position wherein the alignment knob is retracted in the opening and an extended position wherein the alignment knob projects out of the opening;

a biasing member that urges the alignment knob toward the extended position; and an anchor member having an interior portion and an opening, wherein the bracket fits inside of the signpost such that, when the bracket and the signpost are assembled, the opening of the support side is aligned with the opening of the signpost and the alignment knob protrudes through the aligned openings to secure the bracket to the signpost;

wherein the signpost fits within the interior portion of the anchor member and the alignment knob protrudes through the anchor member opening when the signpost, bracket and anchor member are assembled; and wherein the anchor member is reinforced by a strengthening sleeve which has at least one opening, wherein the anchor member is fixed to the strengthening sleeve such that when the strengthening sleeve and anchor member are assembled, the opening of the strengthening sleeve is aligned with the opening of the anchor member and can receive the alignment knob.

2. A signpost assembly comprising:

a signpost having at least one opening;

a bracket having a first support side and a second support side and a hinge connecting the support sides, at least one of the first and second support sides defining an opening;

a pin located between the support sides and having an alignment knob that is located in the opening of the bracket when the bracket and the pin are assembled, the alignment knob being movable between a retracted position wherein the alignment knob is retracted in the opening and an extended position wherein the alignment knob projects out of the opening; and a biasing member that urges the alignment knob toward the extended position;

wherein the bracket fits inside of the signpost such that, when the bracket and the signpost are assembled, the opening of the support side is aligned with the opening of the signpost and the alignment knob protrudes through the aligned openings to secure the bracket to the signpost; and wherein the support side defining the opening is movable by rotation around the hinge between a first expanded position and a second compressed position.

3. The signpost assembly of claim 2 wherein the hinge is formed by angled walls which converge inwardly and collectively form a base.

4. The signpost assembly of claim 2 wherein the bracket further comprises a compression flange adjacent to one support side, the compression flange having a wing portion which is parallel to and inset from the support side.

5. The signpost assembly of claim 4 wherein the compression flange further comprises a hole through which a spring release tool can be threaded.

6. The signpost assembly of claim 5 further comprising a spring release tool having a stiff elongate body and a hook at one end capable of fitting through the hole in the compression flange and the opening in the signpost such that, in use, the hook fits through the hole in the compression flange and captures the flange, enabling the flange to be compressed by pulling on the spring release tool.

7. The signpost assembly of claim 4 wherein the wing portion further comprises an indentation on the edge of the upper end adapted for grasping by the digit of a hand.

8. The signpost assembly of claim 2 further comprising an insert and removal tool having:

a handle;

a blade assembly attached to the handle, the blade assembly having a long blade and a short blade which are parallel to each other at their ends distal to the handle;

wherein theblades are spaced apart to receive the bracket such that one of said blades holds the pin and the spring in its compressed position when the bracket is positioned in the insert and removal tool.

9. A signpost assembly comprising:

a signpost having a pair of openings;

a bracket having a first support side and a second supIport sisie and a base connectIng the support sides, the first and second support sides each defining an opening;

a first pin and a second pin, each having an alignment knob;

a spring biasing the first pin and the second pin fromn a first position wherein the alignment knobs are close together to a second position wherein the alignment knobs are spaced further apart than in the first position; and an anchor member having a pair of openings;

wherein the openings of the first and second support sides are adapted to receive a respective elignment knob, so that when the pins arc placed between the first and second support sides, the alignment knobs protrude through the openings in the support sides of the bracket; and wherein the bracket is adapted to fit between the pair of openings of the signpost such that the openings of the first and second support sides are aligned with the pair of openings of the signpost, the alignment knobs protrude through the aligned openings to secure the bracket to the signpost; and wherein the anchor member is reinforced by a strengthening sleeve, the strengthening sleeve having at least one pair of openings opposite each other andl whose cross sectional area is sufficient to fit a cross sectional area of the anchor member within it, the strengthening sleeve openings being sized to receive the alignment knobs and being aligned with the anchor menmber openings.

10. The signpost assembly of claim 9 wherein each of the first and second pins has a stop flange adjacent to the alignment knob, the stop flange having a spring side and a bracket side.

11. The signpost assembly of claim 9 wherpin the signpost has a cross sectional area, the pair of openings oft the anchor member are opposite each other and the cross sectional area of the anchor member is sufficient to fit the cross sectional area of the signpost within it, the anchor member openings being sized to receive the alignment knobs.

12. The signpost assembly of claim 11 wherein each opening in the signpost is aligned with one of the openings in the anchor member, and the alignment knobs further protrude into the anchor openings.

13. The signpost assembly of claim 9 wherein the anchor member is inserted into a substrate having a substrate level so that no portion of the anchor member is above the substrate level.

14. A signpost assembly comprising:

a signpost having a pair of openings;

a bracket having a first support side and a second support side and a hinge connecting the support sides, the first and second support sides each defining an opening;

a first pin and a second pin, each having an alignment knob; and a spring biasing the first pin and the second pin from a first position wherein the alignment knobs are close together to a second position wherein the alignment knobs are spaced further apart than in the first position, wherein the openings of the first and second support sides are adapted to receive a respective alignment knob, so that when the pins are placed between the first and second support sides, the alignment knobs protrude through the openings in the support sides of the bracket;

wherein the bracket is adapted to fit between the pair of openings of the signpost such that the openings of the first and second support sides are aligned with the pair of openings, the alignment knobs protrude through the aligned openings to secure the bracket to the signpost; and wherein the support sides are moveable by rotation around the hinge between a first expanded position and a second compressed position.

15. The signpost assembly of claim 14 wherein the hinge is formed by angled walls which converge inwardly and collectively form a base.

16. The signpost assembly of claim 15 wherein the base is smaller with respect to the cross sectional area of the signpost than the support sides.

17. The signpost assembly of claim 14 wherein the bracket further comprises two compression flanges, one adjacent to each support side, each compression flange having a wing portion which is parallel to but inset from the support sides.

18. The signpost assembly of claim 17 wherein each compression flange further comprises a hole through which a spring release tool can be threaded.

19. The signpost assembly of claim 18 wherein the wing portion further comprises two indentations on the edge of the upper end adapted for grasping by the digits of a hand.

20. The signpost assembly of claim 14 further comprising an insert and removal tool having:

a handle into which is fixed a long blade and a short blade which are formed in a "V" shape where they connect to the handle and which are parallel to each other at their ends distal to the handle, wherein the blades are adapted to receive the bracket, spring and first and second pins so that the spring is compressed when seated in the insert and removal tool.

* * * * *